United States Patent
Olson et al.

(10) Patent No.: US 11,410,282 B2
(45) Date of Patent: Aug. 9, 2022

(54) NEURAL PROCESSING FILTER

(71) Applicant: Arm Limited, Cambridge (GB)

(72) Inventors: Jens Olson, Santa Clara, CA (US);
Suraj Sudhir, Santa Clara, CA (US)

(73) Assignee: Arm Limited, Cambridge (GB)

(*) Notice: Subject to any disclaimer, the term of this patent is extended or adjusted under 35 U.S.C. 154(b) by 311 days.

(21) Appl. No.: 16/836,440

(22) Filed: Mar. 31, 2020

(65) Prior Publication Data

US 2021/0304378 A1 Sep. 30, 2021

(51) Int. Cl.
*G06T 5/30* (2006.01)
*G06N 3/063* (2006.01)

(52) U.S. Cl.
CPC ............... *G06T 5/30* (2013.01); *G06N 3/063* (2013.01); *G06T 2207/20024* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2018/0032857 A1* | 2/2018 | Lele | ...................... | G06N 3/0454 |
| 2019/0065896 A1* | 2/2019 | Lee | .......................... | G06N 3/04 |
| 2019/0340498 A1* | 11/2019 | Mills | ..................... | G06N 3/0454 |
| 2020/0034148 A1* | 1/2020 | Sumbul | ............... | G06F 15/7821 |
| 2020/0082244 A1* | 3/2020 | Cho | ......................... | G06K 9/6232 |
| 2020/0151088 A1* | 5/2020 | Gu | .......................... | G06F 30/343 |
| 2020/0301994 A1* | 9/2020 | Dikici | ................... | G06F 17/153 |
| 2021/0012141 A1* | 1/2021 | Rao | ....................... | G06K 9/6232 |

OTHER PUBLICATIONS

Shi, B.—"Winograd-based Real-time Super-Resolution System on FPGA"—2019 IEEE, pp. 423-426 (Year: 2019).*
Fleischer et al., "A Scalable Multi-TeraOPS Deep Learning Processor Core for Al Training and Inference", IBM TJ Watson Research Center, Yorktown Heights, NY; IBM Systems Group, Poughkeepsie, NY; Boeblingen Germany; East Fishkill, NY, 2018 Symposium on VLSI Circuits Digest of Technical Papers, Jun. 18, 2018.

* cited by examiner

*Primary Examiner* — Bernard Krasnic
(74) *Attorney, Agent, or Firm* — EIP US LLP

(57) ABSTRACT

A computer-implemented method of providing a filter (F) in a neural processing unit comprises: receiving input corresponding to target dimensions ($X_T$, $Y_T$) of the filter; receiving input corresponding to sub-filter dimensions ($X_{1...n}'$, $Y_{1...n}'$) of each of a plurality of sub-filters ($SF_{1...n}$) implementable in the neural processing unit; and defining the filter (F) as a combination of the plurality of sub-filters ($SF_{1...n}$), the combination having dimensions that equate to the target dimensions ($X_T$, $Y_T$), and wherein the sub-filter dimensions ($X_{1...n}'$, $Y_{1...n}'$) of at least two of the sub-filters in the combination are unequal.

12 Claims, 5 Drawing Sheets

NEURAL PROCESSING FILTER

BACKGROUND OF THE INVENTION

Field of the Invention

The present disclosure relates to a computer-implemented method, a non-transitory computer-readable storage medium, and a system for providing a filter in a neural processing unit.

Description of the Related Technology

Neural processing systems may employ a neural processing unit "NPU". An NPU, also known as a neural processor, a neural network accelerator and an AI accelerator, is used to accelerate a machine learning algorithm. By including specialized electronic circuitry designed for one or more specified neural network architectures, NPUs process input data, such as image data, more efficiently than general purpose processors.

One particular type of neural network is known as a convolutional neural network, "CNN", and is routinely used in image classification. A CNN includes one or more convolutional layers, each of which take an input feature map and convolve it with a filter, also known as a kernel, to produce an output feature map. The goal of the convolution is to extract high-level features from the input feature map, such as edges in an image. The filter of a convolutional layer includes a set of weights which are multiplied by the values in the input feature map in the convolution operation to generate the values in the output feature map. CNNs also contain other layer types such as input, output, pooling, and fully connected.

Other types of neural networks also employ filters. Recurrent Neural Networks, "RNNs", which are used to model temporal dynamic behaviour, include a network of neuron-like nodes arranged in successive layers. Input nodes receive data from outside the network, output nodes yield results, and hidden nodes modify data between the input and the output. Each node in a layer is connected via a one-way connection to every other node in the next successive layer. Each node has a time-varying real-valued activation. Each connection has a modifiable real-valued weight. These weights in the RNN may also be represented by a filter.

Thus, filters form a key element of a neural network and often consume a large amount of processing.

SUMMARY

The present disclosure relates to a computer-implemented method of providing a filter in a neural processing unit. According to a first aspect of the present disclosure the method includes:
  receiving input corresponding to target dimensions of the filter;
  receiving input corresponding to sub-filter dimensions of each of a plurality of sub-filters implementable in the neural processing unit; and
  defining the filter as a combination of the plurality of sub-filters, the combination having dimensions that equate to the target dimensions, and wherein the sub-filter dimensions of at least two of the sub-filters in the combination are unequal.

According to a second aspect of the present disclosure, the sub-filter dimensions of each of the plurality of sub-filters include an X-dimension parameter representing a number of columns of the sub-filter, and a Y-dimension parameter representing a number of rows of the sub-filter, and wherein a size of each sub-filter is defined by a product of the X-dimension parameter and the respective Y-dimension parameter; and wherein defining the filter as a combination of the plurality of sub-filters, comprises successively including sub-filters in the combination until the target dimensions of the filter are filled by the combination with no remaining space, each included sub-filter having the largest possible sub-filter size that fits into the remaining space.

According to a third aspect of the present disclosure, a non-transitory computer-readable storage medium is provided.

According to a fourth aspect of the present disclosure, a system is provided.

The functionality disclosed in relation to computer-implemented method may also be implemented in the non-transitory computer-readable storage medium, and in the system.

Further aspects, features and advantages will become apparent from the following description of preferred embodiments, given by way of example only, which is made with reference to the accompanying drawings.

DETAILED DESCRIPTION OF CERTAIN INVENTIVE EMBODIMENTS

Embodiments of the present application are provided with reference to the following description and the figures. In this description, for the purposes of explanation, numerous specific details of certain examples are set forth. Reference in the specification to "an example", "an embodiment" or similar language means that a feature, structure, or characteristic described in connection with the example is included in at least that one example. It is also to be appreciated that features described in relation to one example or embodiment may also be used in another example or embodiment and that all features are not necessarily duplicated for the sake of brevity.

In the present disclosure, reference is made to embodiments of a filter within the context of a convolutional layer of a CNN. It is however to be appreciated that the filter may be used in other types of layers and in other types of neural networks, such as for example a RNN.

Figure 1:
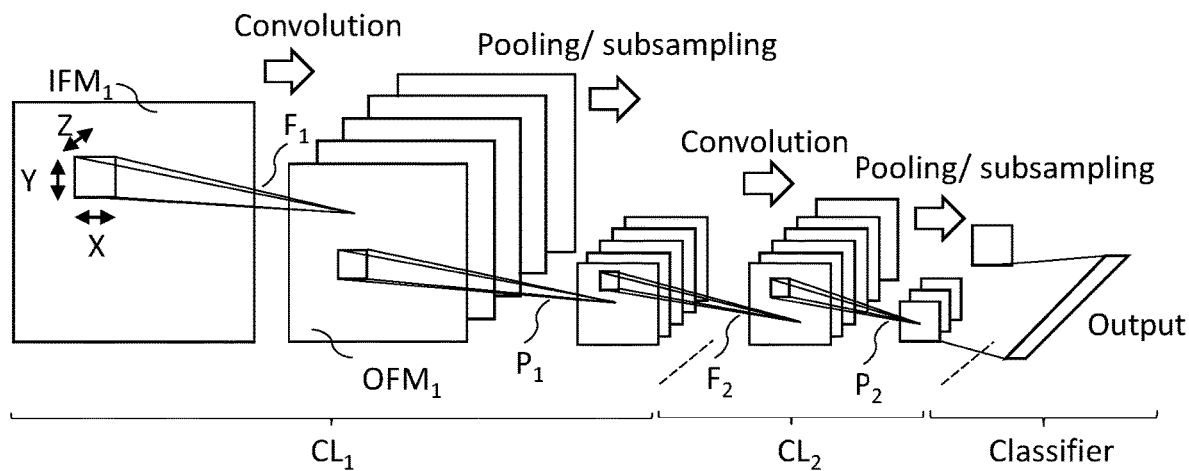
FIG. 1 illustrates a prior art CNN that applies a filter $F_{1...k}$ to an input feature map $IFM_1$ to generate an output feature map $OFM_1$ in a convolutional layer $CL_1$.

Thereto, FIG. 1 illustrates a prior art CNN that applies a filter $F_{1...k}$ to an input feature map $IFM_1$ to generate an output feature map $OFM_1$ in a convolutional layer $CL_1$. The CNN of FIG. 1 may for instance be used to classify an image that is provided to the CNN as input feature map $IFM_1$. The example CNN of FIG. 1 includes two convolutional layers $CL_1$, $CL_2$. Each convolutional layer includes a filter $F_1$, $F_2$, that is convolved with an input feature map to generate an output feature map. The input feature map is provided in the form of an array and can be described as having certain dimensions; specifically one or more of: a column dimension that is equal to the number of columns in the input feature map, a row dimension that is equal to the number of rows in the input feature map, and a depth dimension. Using the example wherein the input feature map $IFM_1$ is an image, the column and row dimensions of the input feature map $IFM_1$ array may identify a position in the image such as a pixel, and the depth dimension may correspond to a particular colour channel in the image represented by the input feature map $IFM_1$ such as red, green and blue. In this example the values of the array elements then correspond to the intensities of each of the red, green and blue colour channels of each pixel represented by the image in the input feature map $IFM_1$. Whilst an image is used as an example of the input feature map $IFM_1$ in FIG. 1, it is noted that CNNs may be used to model and furthermore classify or postprocess other types of data including text and speech. As with the input feature map $IFM_1$, each of the filters $F_1$, $F_2$ in FIG. 1 can also be described as an array having certain dimensions: again, these may include one or more of: a column dimension X that is equal to the number of columns in the filter, a row dimension Y that is equal to the number of rows in the filter, and a depth dimension Z. The example filter $F_1$ in FIG. 1 has X columns and Y rows and a depth of Z=5, as indicated by the depth of its resulting output feature map $OFM_1$ being 5. For simplicity however, only the first layer, Z=1 of the filter $F_1$ is illustrated.

With continued reference to FIG. 1, the Convolution step in convolutional layer $CL_1$, involves stepping filter $F_1$ across the input feature map $IFM_1$, whilst at each step: multiplying each element, or "weight" in the filter $F_1$ with its corresponding element in the input feature map $IFM_1$ and summing the result for all X, Y positions in the filter $F_1$. The summed result for all X, Y positions in the filter provides the data value of the output feature map $OFM_1$ at that step. The step size is determined by the filter "stride". After stepping the filter by a step-size determined by the stride the summed result is again computed for all X, Y positions in the filter at the new position and this provides the data value of the output feature map $OFM_1$ at that step. This convolution operation is carried out in the same manner for each step in the depth dimensions Z of the filter $F_1$, and thus the output feature map $OFM_1$ has a depth dimension that is equal to the depth dimension Z of the filter $F_1$.

With further reference to the convolutional layer $CL_1$ in FIG. 1, the output feature map $OFM_1$, is then subjected to a pooling or "sub-sampling" operation wherein the values of groups of elements $P_1$ in the output feature map $OFM_1$ are down-sized into a single value in an output array. This pooling or sub-sampling operation may for example include replacing the individual values in the group $P_1$ with their average value, or their maximum value. The pooling operation is typically used to reduce the dimensions of the array that is input to the next convolutional layer, in this case $CL_2$.

The output of the convolutional layer $CL_1$ then serves as the input feature map to convolutional layer $CL_2$.

Similar operations to those described with reference to convolutional layer $CL_1$ are also carried out in convolutional layer $CL_2$. Specifically, a convolution operation is performed by filter $F_2$ and a pooling operation is performed on the result of the convolution with grouping $P_2$.

The output of convolutional layer $CL_2$ in FIG. 1 is then provided as input to the Classifier layer. The Classifier layer may include one or more fully connected layers, and it takes the output of convolutional layer $CL_2$ and provides as output an N-dimensional vector wherein N is the number of classes the program has to choose from to classify the input image.

During a training process, the weights of the filters $F_1$, $F_2$ in FIG. 1 are adjusted through a mechanism called backpropagation in order to optimize their values. The filter weights are adjusted such that the CNN classifies a variety of different images belonging to the same classification with high probability of them having same classification. Having completed this, a filter with the optimized filter weights may then be convolved with news image in order to determine which classification each of the new images belong to.

As may be appreciated from the above description of a CNN, the convolution places an intense processing burden on a processor. Indeed, a document entitled "A Scalable Multi-TeraOPS Deep Learning Processor Core for AI Training and Inference" by B. Fleischer et al., VLSI Symposium 2018, reports that convolutions account for between 70% and 90% of the processing in common neural networks. Thus, any improvement to the efficiency of the convolution process would have a dramatic impact on CNNs; and likewise on other neural networks that use filters.

Figure 2:
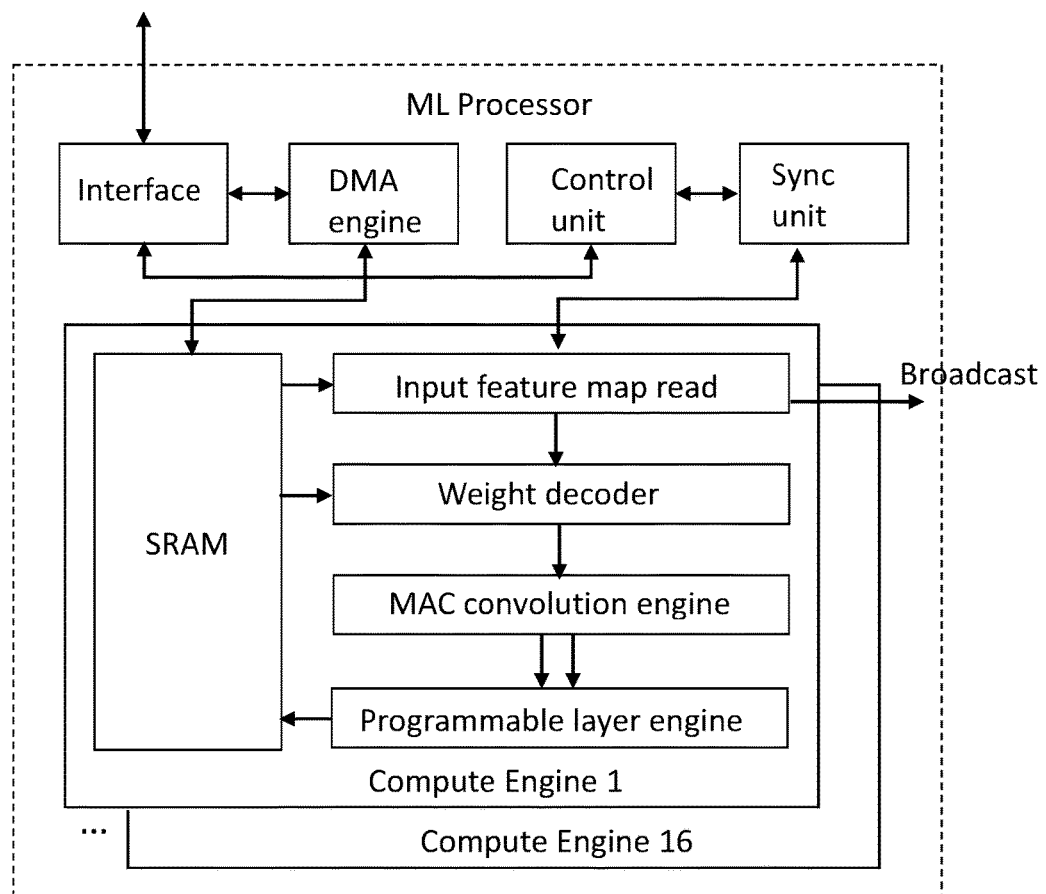
FIG. 2 illustrates a prior art neural processing unit in which a CNN may be implemented.
Figure 3A:
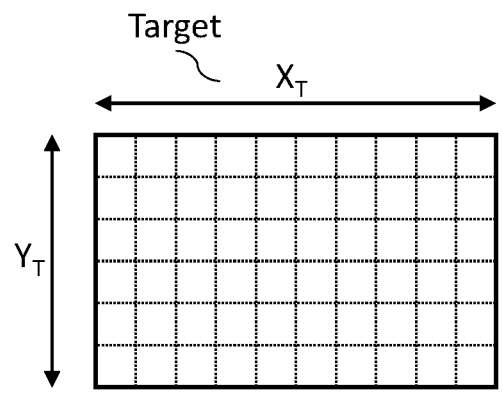
FIG. 3 illustrates some prior art techniques for providing a 10×6 filter in an NPU capable of providing only 4×4, 4×1, 1×4 and 1×1 filters.
Figure 3D:
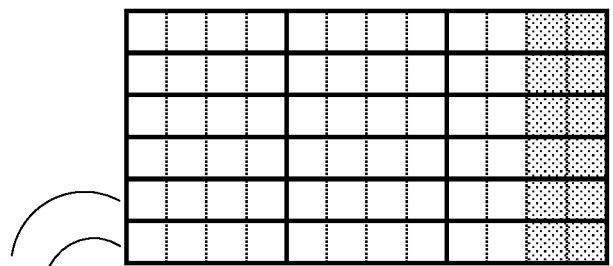
Figure 3B:
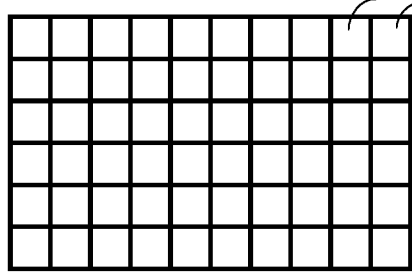
Figure 3E:
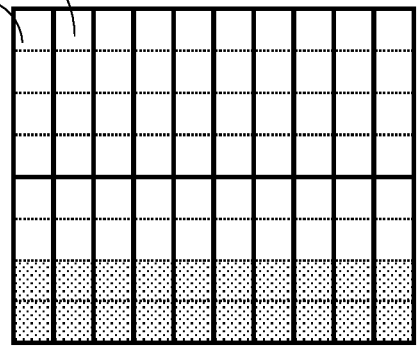
Figure 3C:
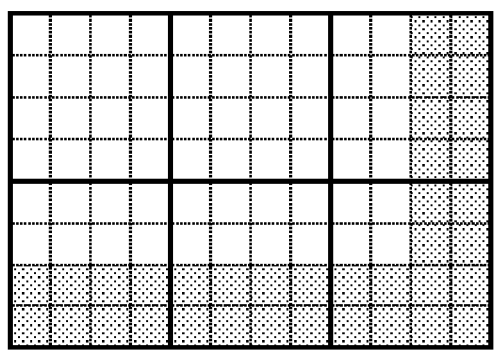

FIG. 2 illustrates a prior art neural processing unit in which a CNN may be implemented. With reference to FIG. 2, in this example, sixteen Compute Engines are available for performing up to sixteen simultaneous convolutions. The units: Interface, DMA engine, Control unit, and Sync Unit manage the flow of data to and from each of the sixteen Compute Engines. Within each Compute Engine is a MAC Engine which performs the actual "Multiply and Accumulate" part of each convolution. Each Compute Engine also includes a memory in the form of Static RAM unit SRAM. In operation an input feature map is stored in SRAM and routed to a MAC engine in one of the Compute Engines by the DMA unit, the Control Unit and the Sync Unit. The Sync Unit also determines based on the size of the input feature map and filter, whether either or both of the input feature map and filter need to be sub-divided into smaller and thus more processable chunks. The unit SRAM also stores the filter weights of a filter used in the MAC engine, and these are received by the MAC engine via the Weight Decoder. Thus, the MAC convolution engine convolves the input feature map with the filter and the resulting output feature map is passed from the MAC engine to SRAM by the Programmable Layer Engine.

Filters that are used in the convolutional layers may vary widely in dimensions depending upon the nature of the network. However, the known neural processing units such as that illustrated in FIG. 2 are conventionally only able to natively implement filters in a limited number of sizes. For instance, a particular neural processing unit might offer only filters that have the following dimensions (represented as number of columns×number of rows): 4×4, 4×1, 1×4 or 1×1. The filter sizes are fixed in hardware by the integrated circuit designer at the time of making the neural processing unit. When implementing a neural network on a neural processing unit, a programmer takes into account the sizes and dimensions of its filters that are available and how to synthetically modify the neural network filters to be accommodated within the filter sizes supported by the neural processing unit. If the desired dimensions of the filter, i.e. the target filter dimensions, exceed those that are available from any filter in the neural processing unit, the programmer instructs the neural processing unit to use multiple identical "sub-filters" to provide the desired filter dimensions. If only identical sized sub-filters are selected in this process, the resulting filter often has a size that exceeds the desired filter dimensions. Zero values, or "weight paddings", are typically used for the filter array elements in positions that lie outside the desired filter dimensions. The filter is said to be "padded", and this leads to a processing inefficiency.

To further illustrate this point, FIG. 3 illustrates some prior art techniques for providing a 10×6 filter in an NPU capable of providing only 4×4, 4×1, 1×4 or 1×1 filters. In FIG. 3A a desired, or "Target" filter has a target X-dimension parameter $X_T$ representing a number of columns of the target filter and a target Y-dimension parameter $Y_T$ representing a number of rows of the target filter. A size of the target filter is defined by a product of the X-dimension parameter $X_T$ and the Y-dimension parameter $Y_T$. Thus, the illustrated target filter has dimensions 10×6 and a size of 60. In the example of FIG. 3 a particular neural processing unit only offers filters, termed "sub-filters" that have the following dimensions: 4×4, 4×1, 1×4 or 1×1. Using the prior art technique, a user of the neural processing unit may provide a filter as shown in FIG. 3B, i.e. to use 60 sub-filters each with dimensions 1×1. This would provide exactly the desired target filter dimensions but would be comparatively slow due to the inefficiency of processing only a single 1×1 filter at a time when the hardware supports up to 4×4 filter elements, as well as coordinating data movements involved in processing the results from 60 individual sub-filters. A user may alternatively provide the target filter by using six sub-filters each having of dimensions of 4×4. This involves less coordination of data movements since only six sub-filters are used. However, the resulting filter is larger than the target dimensions as indicated by the shaded "padding" at the bottom and right edges of the filter. Typically, zero values are inserted in these padded, shaded, positions in the filter as mentioned above, and computation of this padded region sums to zero, i.e. it is wasted computation. The solutions of FIG. 3D and FIG. 3E also use multiple identical sub-filters and also include filter padding. Filter padding can be undesirable because it results in excess computation that does not affect the result of the output feature map elements and thus wastes processing resources to different extents depending upon how much padding is generated in each case.

In accordance with the present disclosure a computer-implemented method of providing a filter F in a neural processing unit; comprises:

receiving input corresponding to target dimensions $X_T$, $Y_T$ of the filter;

receiving input corresponding to sub-filter dimensions $X_{1 \ldots n}'$, $Y_{1 \ldots n}'$ of each of a plurality of sub-filters $SF_{1 \ldots n}$ implementable in the neural processing unit;

defining the filter F as a combination of the plurality of sub-filters $SF_{1 \ldots n}$, the combination having dimensions that equate to the target dimensions $X_T$, $Y_T$, and wherein the sub-filter dimensions $X_{1 \ldots n}'$, $Y_{1 \ldots n}'$ of at least two of the sub-filters in the combination are unequal.

As described in more detail below, the method may be used to provide a filter in a neural processing unit such as that described with reference to FIG. 2. The method may be used to provide a filter of a neural network layer, such as a convolutional layer. The method may also be used to provide a filter in other types of neural network, such as a RNN. Advantageously, embodiments of the disclosed filter permit more efficient use of processing power in a neural processing unit since its sub-filters equate to the size of the target filter. Thus, filter padding and the unnecessary processing of the input feature map by padding elements may be avoided. Further, it removes the need to buffer input feature map content in regions corresponding to weight padding.

In one example implementation the method may be carried out by a processor that controls the operation of a plurality of parallel processors in a neural processing unit. With reference to FIG. 2, the method may be substantially be carried out by the Sync Unit. The method may alternatively be carried out by another processor in a neural processing unit, or indeed elsewhere in the neural processing unit of FIG. 2. Further aspects of the method may also be carried out elsewhere within the neural processing unit of FIG. 2. The method may alternatively be carried out by a general processor where it defines sub-filters of a filter that is subsequently implemented in a, potentially separate, neural processing unit.

FIG. 4 illustrates embodiments of a method of providing a filter F in a neural processing unit in accordance with some aspects of the present disclosure. In FIG. 4A a desired, or target filter is illustrated as having a target X-dimension parameter $X_T$ representing a number of columns of the target filter and a target Y-dimension parameter $Y_T$ representing a number of rows of the target filter. The illustrated target filter has dimensions 10×6 and a size of 60. In the example of FIG. 4 a particular neural processing unit only offers n filters, termed "sub-filters" that have the following sub-filter dimensions $X_{1 \ldots n}' \times Y_{1 \ldots n}'$: 4×4, 4×1, 1×4, 2×2 and 1×1, as illustrated in FIG. 4H. The dimensions of each sub-filter thus include an X-dimension parameter $X_{1 \ldots n}'$ representing a number of columns of the sub-filter, and a Y-dimension parameter $Y_{1 \ldots n}'$ representing a number of rows of the sub-filter. A size of each sub-filter may also be defined by a product of the X-dimension parameter $X_{1 \ldots n}'$ and the respective Y-dimension parameter $Y_{1 \ldots n}'$.

Figure 4A:
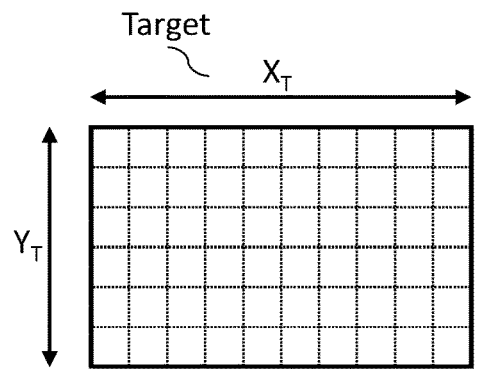
FIG. 4 illustrates embodiments of a method of providing a filter F in a neural processing unit in accordance with some aspects of the present disclosure.
Figure 4E:
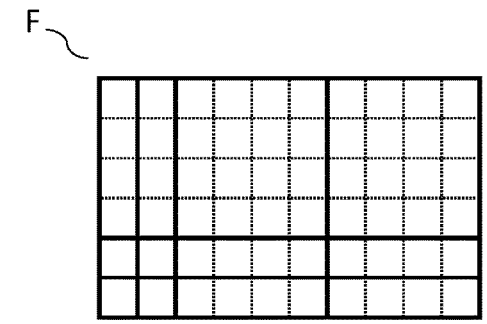
Figure 4B:
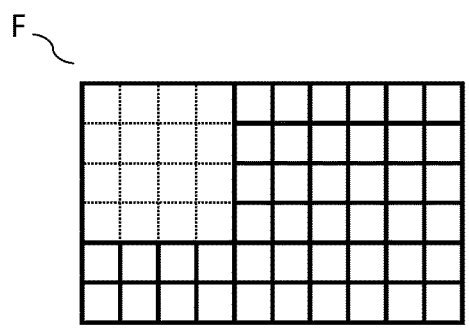
Figure 4F:
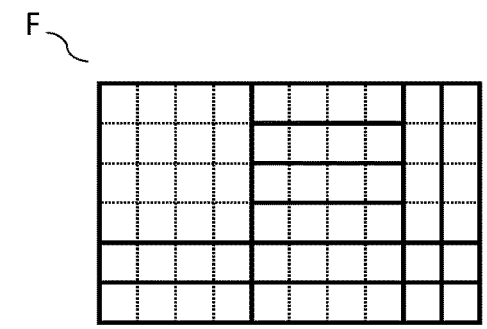

With reference to FIG. 4B, one technique of providing a filter F having dimensions that equate to those of the target filter $X_T$, $Y_T$ includes a single 4×4 sub-filter and forty four sub-filters each with dimensions 1×1. Notably the sub-filter dimensions $X_{1 \ldots n}'$, $Y_{1 \ldots n}'$ of two of the sub-filters in the combination are unequal. This may help to provide exactly the desired target filter dimensions, and moreover, as compared to using 60 individual sub-filters with size 1×1, the processing overhead of combining the results of individual convolutions by the sub-filters is reduced. FIG. 4C-FIG. 4G illustrate alternative techniques for providing a filter F having dimensions that equate to those of the target filter $X_T$, $Y_T$ and which are likewise subject to the constraint that the sub-filter dimensions $X_{1 \ldots n}'$, $Y_{1 \ldots n}'$ of at least two of the sub-filters in the combination are unequal.

Figure 5:
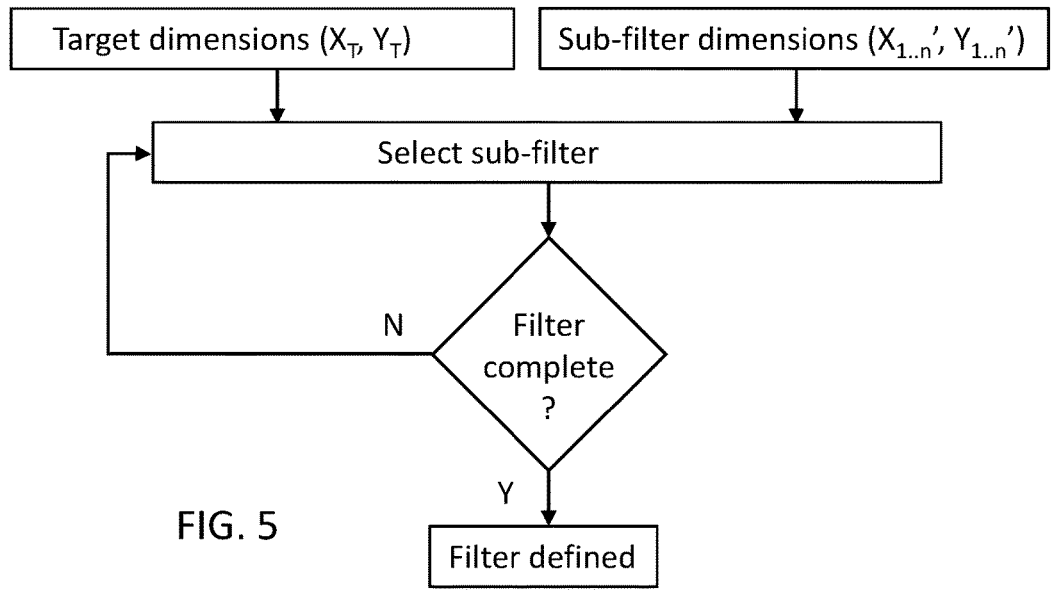
FIG. 5 illustrates a flow diagram of a method of providing a filter F in a neural processing unit in accordance with some aspects of the present disclosure.

FIG. 5 illustrates a flow diagram of a method of providing a filter F in a neural processing unit in accordance with some aspects of the present disclosure. With reference to FIG. 5, the method includes a step of receiving input corresponding to target dimensions $X_T$, $Y_T$ of the filter. The target dimensions may for example be received from a memory. The memory may be within the neural processing unit. Alternatively the target dimensions may be received in the form of user input. These may for instance be input by a programmer during a set-up phase of the NPU. The method also include the step of receiving input corresponding to sub-filter dimensions $X_{1...n}'$, $Y_{1...n}'$ of each of a plurality of sub-filters $SF_{1...n}$ implementable in the neural processing unit. The sub-filter dimensions $X_{1...n}'$, $Y_{1...n}'$ may be received from a memory. For example they may be stored in a memory that stores NPU configuration data and forms part of the NPU. Subsequently the filter F is defined as a combination of the plurality of sub-filters $SF_{1...n}$, the combination having dimensions that equate to the target dimensions $X_T$, $Y_T$, and wherein the sub-filter dimensions $X_{1...n}'$, $Y_{1...n}'$ of at least two of the sub-filters in the combination are unequal. This step may in some implementations be performed iteratively by including successive filters in the combination until the complete filter is defined, as indicated by the loop in FIG. 5.

The sub-filters that, in combination, define the target filter dimensions $X_T$, $Y_T$ in FIG. 5 may be selected in various ways. The general problem of rectangle subdivision is NP-complete, and therefore computationally challenging. In some implementations a lookup table may be used to provide a pre-determined selection of sub-filters. The pre-determined selection may have been optimized based on performance characteristics of the filter such as the total time taken to generate an output feature map from an input feature map. This approach may be practical for commonly-used target filter sizes. In general however the filter dimensions may need to be calculated for a large number of different filter sizes, and sometimes in real-time. Here a greedy approach may be used to provide a solution in a limited amount of time. In this approach the target filter dimensions may be provided by iteratively filling the dimensions of the target filter with sub-filters, at each iteration selecting the largest possible sub-filter size that fits into the remaining space. This greedy approach to a rectangle subdivision problem has polynomial time complexity, which enables us to address the computational intractability of the general rectangle subdivision problem. It also results in a target filter being defined by a low number of sub-filters, which helps to lower the processing overhead of determining the output feature map from the individual convolution results of multiple sub-filters.

In this approach the sub-filter dimensions $X_{1...n}'$, $Y_{1...n}'$ of each of the plurality of sub-filters $SF_{1...n}$ include an X-dimension parameter $X_{1...n}'$ representing a number of columns of the sub-filter, and a Y-dimension parameter $Y_{1...n}'$ representing a number of rows of the sub-filter. A size of each sub-filter is defined by a product of the X-dimension parameter $X_{1...n}'$ and the respective Y-dimension parameter $Y_{1...n}'$. Here, defining the filter as a combination of the plurality of sub-filters $SF_{1...n}$, comprises successively including sub-filters $SF_{1...n}$ in the combination until the target dimensions $X_T$, $Y_T$ of the filter F are filled by the combination with no remaining space, each included sub-filter having the largest possible sub-filter size that fits into the remaining space.

In the above approach of including the sub-filter having the largest possible sub-filter size that fits into the remaining space, if more than one sub-filter satisfies this criteria, the sub-filter having dimensions that are closest to a square in shape, may optionally be selected. This helps to minimize the total number of sub-filters used in the filter F, and consequently reduces the processing overhead of combining the results of individual convolutions by the sub-filters. For instance, a 4×1 sub-filter and a 2×2 sub-filter have the same sub-filter size, and if both sub-filters satisfy the criteria of being the largest sub-filter size that fits into the remaining space, the 2×2 sub-filter is selected because its dimensions are a square in shape. In another example, a 4×4 sub-filter, a 2×8 sub-filter and a 1×16 sub-filter all have the same size, and if all three sub-filters satisfy the criteria of being the largest sub-filter size that fits into the remaining space, the 4×4 sub-filter is selected because its dimensions are a square in shape. This may be generalized as follows: Defining the filter as a combination of the plurality of sub-filters $SF_{1...n}$, may comprise successively including sub-filters $SF_{1...n}$ in the combination until the target dimensions $X_T$, $Y_T$ of the filter F are filled by the combination with no remaining space, each included sub-filter having the largest possible sub-filter size that fits into the remaining space, and if a plurality of sub-filters having the same sub-filter size fit into the remaining space, including from said plurality having the same sub-filter size the sub-filter having the lowest value of $\sqrt{(X_{1...n}')^2+(Y_{1...n}')^2}$.

In some embodiments the dimensions of the target filter may optionally be filled in row-major order. In these embodiments the above step of: successively including sub-filters $SF_{1...n}$ in the combination until the target dimensions $X_T$, $Y_T$ of the filter F are filled by the combination with no remaining space; comprises filling the target dimensions $X_T$, $Y_T$ of the filter in row-major order by, for each of a plurality groups of rows of the filter F:

selecting an initial sub-filter $SFo_1$ for the group of rows, the initial sub-filter $SFo_1$ having the largest possible sub-filter size that fits into the remaining space;

defining a group of rows within the sub-filter dimensions as a group of rows having the same Y-dimension parameter $Y_{1...n}'$ as the initial sub-filter $SFo_1$;

successively including sub-filters $SF_{1...n}$ to fill the group of rows until there is no remaining space in the group of rows, each included sub-filter having the largest possible sub-filter size that fits into the remaining space in the group of rows.

Figure 4C:
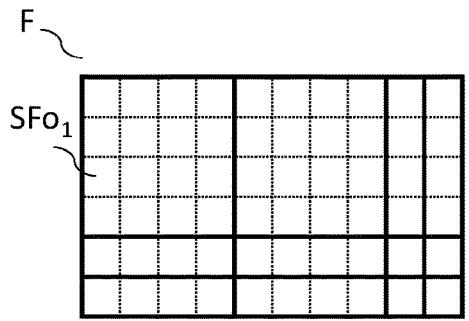
Figure 4G:
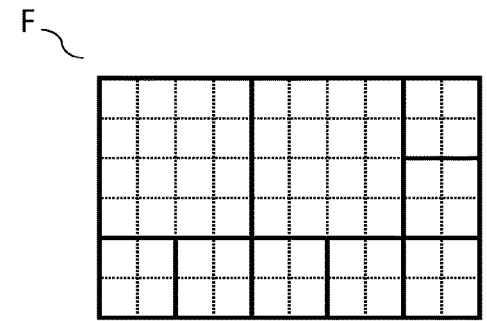
Figure 4D:
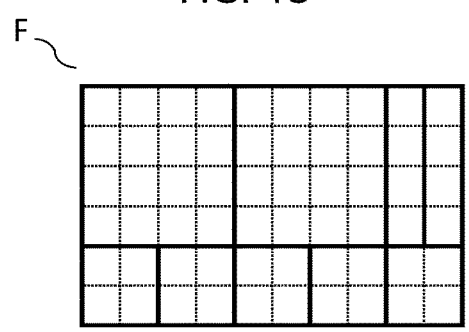
Figure 4H:
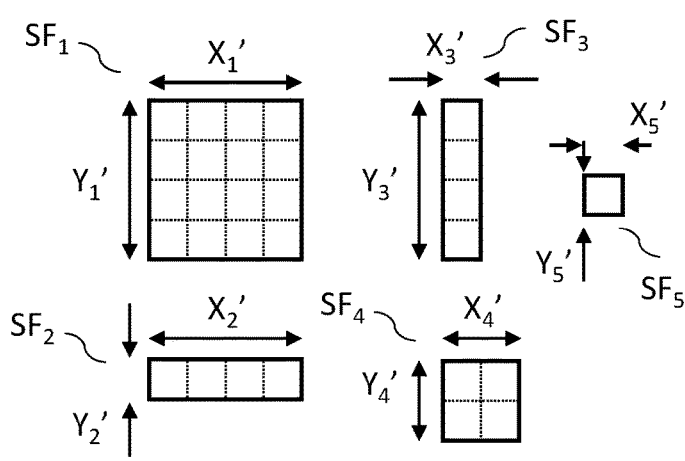

This is illustrated with reference to FIG. 4C. Here the 10×6 dimensions of the example target filter are filled with an initial sub-filter $SFo_1$ with dimensions 4×4; this being the largest sub-filter from those available in FIG. 4H that fits into the 10×6 array. A same-size sub-filter with dimensions 8×2 is not available in FIG. 4, but if it were available, the 4×4 sub-filter would still preferably be selected since, as described above, its dimensions are closer in shape to a square. Thus when selecting an initial sub-filter $SFo_1$ for the group of rows, the initial sub-filter $SFo_1$ having the largest possible sub-filter size that fits into the remaining space, this may optionally further comprise: if a plurality of sub-filters having the same sub-filter size fit into the remaining space, including from said plurality having the same sub-filter size the sub-filter having the lowest value of $\sqrt{(X_{1...n}')^2+(Y_{1...n}')^2}$. Sub-filter $SFo_1$ in FIG. 4C has 4 rows, and the remaining space in this group of 4 rows is then filled before filling the next group of rows. In filling the remaining space in this group of 4 rows, a preference is again made for the sub-filter having the largest possible sub-filter size that fits into the remaining space in the group of rows. A further, optional, selection criteria is that the included sub-filter has the same Y-dimension parameter $Y_{1...n}'$ as the initial sub-filter $SFo_1$. Thus, successively including sub-filters $SF_{1...n}$ to fill the group of rows until there is no remaining space in the group of rows, each included sub-filter having the largest possible sub-filter size that fits into the remaining space in the group of rows, may optionally further comprise: if a plurality of sub-filters having the same sub-filter size fit into the remaining space, including the sub-filter having the same Y-dimension parameter $Y_{1...n}'$ as the initial sub-filter $SFo_1$. By maintaining the same Y-dimension parameter $Y_{1...n}'$ as the initial sub-filter $SFo_1$ the fragmentation of a row is avoided, which simplifies data selection and movement. A 4×4 sub-filter is the largest sub-filter that fits into the remaining space in this group of 4 rows, and so a second 4×4 sub-filter is included in the combination. Moreover, this sub-filter advantageously has a Y-dimension parameter of 4, which is the same as the Y-dimension parameter of the initial sub-filter $SFo_1$. The remaining space on this group of 4 rows has dimensions 2×4 and here a 1×4 sub-filter is included since firstly it is the largest sub-filter that fits into the remaining space on this group of 4 rows, and secondly because it has a Y-dimension parameter of 4, which is the same as the Y-dimension parameter of the initial sub-filter $SFo_1$. The 1×4 sub-filter has the same size as a 2×2 sub-filter, and so a 2×2 sub-filter could have been included instead, as illustrated in FIG. 4G, however this would be less optimal than a 1×4 because it leads to fragmentation of the row. Finally, the remaining space in the row in FIG. 4C is filled with another 1×4 sub-filter (or alternatively, and less optimally, two steps of including 2×2 sub-filters as in FIG. 4G). Next, the remaining space in the target filter in FIG. 4C has dimensions 10×2. The largest sub-filter that fits into this space is a 4×1 sub-filter (FIG. 4C), or a 2×2 sub-filter (FIG. 4G). A 4×1 sub-filter is preferred since it has the same X-dimension parameter of the initial sub-filter $SFo_1$; specifically 4, and this helps to avoid fragmentation of the columns, simplifying data selection and movement. Thus, selecting an initial sub-filter $SFo_1$ for the group of rows, the initial sub-filter $SFo_1$ having the largest possible sub-filter size that fits into the remaining space may optionally comprise: if a plurality of sub-filters having the same sub-filter size fit into the remaining space, including the sub-filter having the same X-dimension parameter $X_{1\ldots n}'$ as the initial sub-filter $SFo_1$ of the previous group of rows as an alternative to: if a plurality of sub-filters having the same sub-filter size fit into the remaining space, including from said plurality having the same sub-filter size the sub-filter having the lowest value of $\sqrt{(X_{1\ldots n}')^2+(Y_{1\ldots n}')^2}$. The remainder of the group of rows defined by this initial sub-filter for the group of rows (1 row for FIG. 4C, 2 rows for FIG. 4G) is now filled with further filters, subject to the constraint that the largest size filter is selected at each step. In filling the remaining space in this group of rows, a preference is again made at each step for the sub-filter having the largest possible sub-filter size that fits into the remaining space in the group of rows. Thus in FIG. 4C the sub-filters 4×1, 1×1 and 1×1 have the same Y-dimension parameter of 1 as the initial sub-filter $SFo_1$ that defines this group of 1 rows. Two 1×1 sub-filters are used at the end of this row since these are the largest sub-filters that fit in this group of rows and no 2×1 sub-filter is available. In FIG. 4C the last group of 1 rows is filled in the same manner. In so doing the dimensions of the target filter are filled in groups of rows, starting each group of rows with the largest size of sub-filter; i.e. determined by the product of its rows and its columns, that fits into the remaining space and filling the space in each group of rows that is defined by the initial filter in each row with the largest possible sub-filter. By choosing the largest possible sub-filter size that fits into the remaining space when selecting the initial sub-filter $SFo_1$, and also when successively including sub-filters $SF_{1\ldots n}$ to fill the group of rows, this implementation also benefits from being able to provide a solution in a limited amount of time.

In some embodiments, instead of filling the dimensions of the target filter in row-major order, the dimensions of the target filter may instead be filled in column-major order. In these embodiments the above step of: successively including sub-filters $SF_{1\ldots n}$ in the combination until the target dimensions $X_T$, $Y_T$ of the filter F are filled by the combination with no remaining space; comprises filling the target dimensions $X_T$, $Y_T$ of the filter in column-major order by, for each of a plurality groups of columns of the filter F:

selecting an initial sub-filter $SFo_1$ for the group of columns, the initial sub-filter $SFo_1$ having the largest possible sub-filter size that fits into the remaining space;

defining a group of columns within the sub-filter dimensions as a group of columns having the same X-dimension parameter $X_{1\ldots n}'$ as the initial sub-filter $SFo_1$;

successively including sub-filters $SF_{1\ldots n}$ to fill the group of columns until there is no remaining space in the group of columns, each included sub-filter having the largest possible sub-filter size that fits into the remaining space in the group of columns.

As with the row-major order selection, by choosing the largest possible sub-filter size that fits into the remaining space when selecting the initial sub-filter $SFo_1$, and also when successively including sub-filters $SF_{1\ldots n}$ to fill the group of columns, this implementation also benefits from being able to provide a solution in a limited amount of time. In a similar manner to the row-major order selection, when selecting an initial sub-filter $SFo_1$ for the group of columns, the initial sub-filter $SFo_1$ having the largest possible sub-filter size that fits into the remaining space, may optionally further comprise: if a plurality of sub-filters having the same sub-filter size fit into the remaining space, including from said plurality having the same sub-filter size the sub-filter having the lowest value of $\sqrt{(X_{1\ldots n}')^2+(Y_{1\ldots n}')^2}$. A further, optional, selection criteria is that the included sub-filter has the same X-dimension parameter $X_{1\ldots n}'$ as the initial sub-filter $SFo_1$. Thus, successively including sub-filters $SF_{1\ldots n}$ to fill the group of columns until there is no remaining space in the group of columns, each included sub-filter having the largest possible sub-filter size that fits into the remaining space in the group of columns, may optionally further comprise: if a plurality of sub-filters having the same sub-filter size fit into the remaining space, including the sub-filter having the same X-dimension parameter $X_{1\ldots n}'$ as the initial sub-filter $SFo_1$. A further optional criteria is that, when selecting an initial sub-filter $SFo_1$ for the group of columns, the initial sub-filter $SFo_1$ having the largest possible sub-filter size that fits into the remaining space may optionally comprise: if a plurality of sub-filters having the same sub-filter size fit into the remaining space, including the sub-filter having the same Y-dimension parameter $Y_{1\ldots n}'$ as the initial sub-filter $SFo_1$ of the previous group of columns as an alternative to: if a plurality of sub-filters having the same sub-filter size fit into the remaining space, including from said plurality having the same sub-filter size the sub-filter having the lowest value of $\sqrt{(X_{1\ldots n}')^2+(Y_{1\ldots n}')^2}$.

In some embodiments the filter that is defined includes a sub-filter that has the largest X-dimension parameter $X_{1\ldots n}'$, or the largest Y-dimension parameter $Y_{1\ldots n}'$, or the largest size. In these embodiments the target dimensions $X_T$, $Y_T$ of the target filter include a target X-dimension parameter $X_T$ representing a number of columns of the filter F and a target Y-dimension parameter $Y_T$ representing a number of rows of the filter F; and wherein the sub-filter dimensions $X_{1\ldots n}'$, $Y_{1\ldots n}'$ of each of the plurality of sub-filters $SF_{1\ldots n}$ include a corresponding X-dimension parameter $X_{1\ldots n}'$ representing a number of columns of the sub-filter and a corresponding Y-dimension parameter $Y_{1\ldots n}'$ representing a number of rows of the sub-filter. Moreover, the combination includes at least one sub-filter $SF_{1...n}$ having:
- the largest X-dimension parameter $X_{1...n}'$, or
- the largest Y-dimension parameter $Y_{1...n}'$, or
- the largest size, the size being defined by a product of the X-dimension parameter $X_{1...n}'$ and the Y-dimension parameter $Y_{1...n}'$;

that fits within the target dimensions $X_T, Y_T$ of the filter F.

Using the largest sub-filter, in terms of columns or in terms of rows or size, may provide more optimal use of the available sub-filters.

In some embodiments the target filter may be referred-to as a "large" target filter, defined herein as a target filter having dimensions that are too large to be provided by any single sub-filter. A large target filter may be defined as a filter wherein the target dimensions X, Y include a target X-dimension parameter $X_T$ and a target Y-dimension parameter $Y_T$; and wherein the sub-filter dimensions $X_{1...n}', Y_{1...n}'$ of each of the plurality of sub-filters $SF_{1...n}$ implementable in the neural processing unit include a corresponding X-dimension parameter $X_{1...n}'$ representing a number of columns of the sub-filter and a corresponding Y-dimension parameter $Y_{1...n}'$ representing a number of rows of the sub-filter; and wherein:
- the target X-dimension parameter $X_T$ equals or exceeds a maximal implementable X-dimension parameter $X'_{max}$ that is the maximum of said X-dimension parameters $X_{1...n}'$ implementable in the neural processing unit; and/or
- the target Y-dimension parameter $Y_T$ equals or exceeds a maximal implementable Y-dimension parameter $Y'_{max}$ that is the maximum of said Y-dimension parameters $Y_{1...n}'$ implementable in the neural processing unit.

In some embodiments the minimum number of sub-filters is used to provide the filter. The minimum number of sub-filters that together equate to the target dimensions $X_T, Y_T$ of the filter F may be determined using an optimization function. This optimization may be carried out prior to the need to implement the filter and for example stored in a lookup table in order to save time during its implementation. In these embodiments the combination of the plurality of sub-filters $SF_{1...n}$ that equate to the target dimensions $X_T, Y_T$ of the filter F corresponds to the minimum number of sub-filters that can equate to the target dimensions $X_T, Y_T$ of the filter F.

Figure 6A:
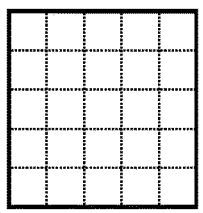
FIG. 6 illustrates an implementation of a dilated filter in accordance with some aspects of the present disclosure.
Figure 6C:
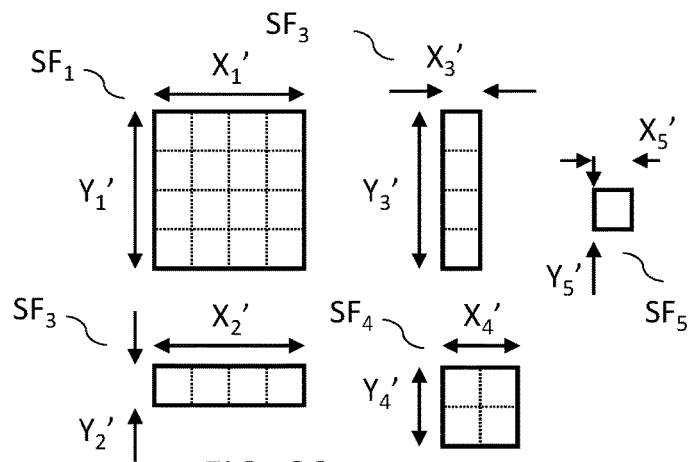
Figure 6B:
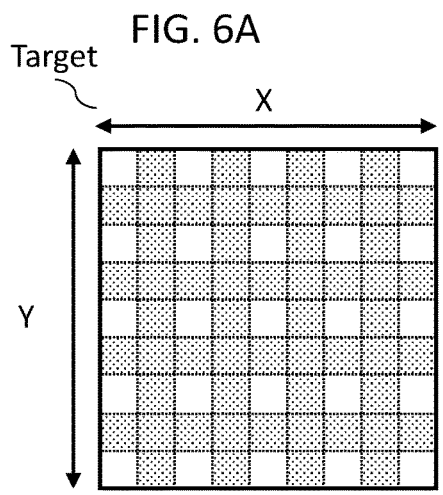
Figure 6D:
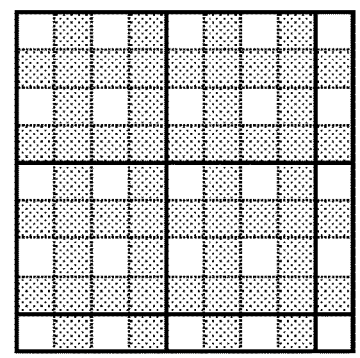

Dilated filters may also be implemented using the above principles. A dilated filter sparsely samples the input feature map during the convolution step. A dilated filter may be implemented by expanding the filter and inserting zero values depending in the dilation rate. Thereto, FIG. 6 illustrates an implementation of a dilated filter in accordance with some aspects of the present disclosure. In FIG. 6A a 5×5 filter is illustrated. In FIG. 6B a dilated version of the FIG. 6A filter is illustrated with a dilation rate of 1. The 5×5 filter dilates to a 9×9 filter. Zero weights are used in the shaded regions of the filter. The target filter of FIG. 6B therefore has dimensions 9×9. FIG. 6D illustrates one example method of providing the dilated target filter using a combination of the possible sub-filters illustrated in FIG. 6C, and subject to the constraints that the combination of the sub-filters have dimensions that equate to the target filter dimensions, and that the sub-filter dimensions $X_{1...n}', Y_{1...n}'$ of at least two of the sub-filters in the combination are unequal. Thus, here filter F comprises a dilated filter; and the target dimensions $X_T, Y_T$ provided by the combination of the plurality of sub-filters $SF_{1...n}$ correspond to the dimensions of the dilated filter.

Figure 7:
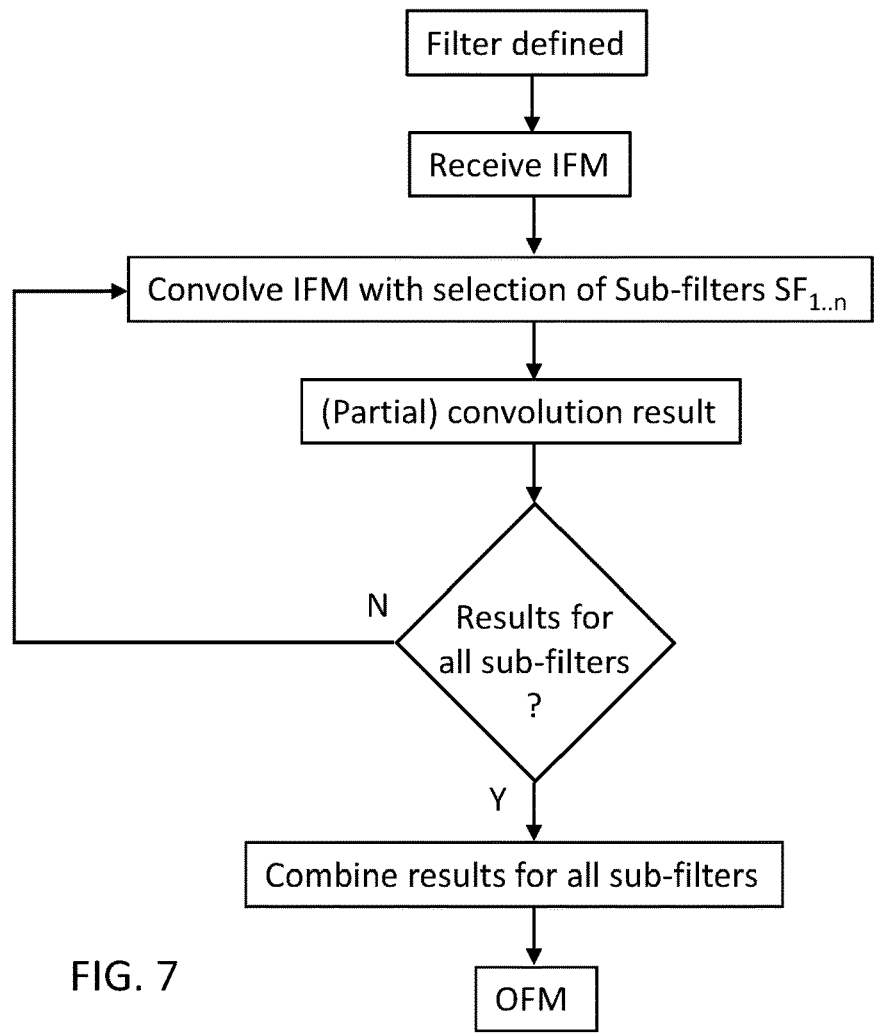
FIG. 7 illustrates a flow diagram of the use of a filter in a CNN in accordance with some aspects of the present disclosure.

After the filter has been defined it may be used in neural network. In one implementation the filter is used in a CNN to convolve an input feature map. Thereto, FIG. 7 illustrates a flow diagram of the use of a filter in a CNN in accordance with some aspects of the present disclosure. Continuing from the method of FIG. 5, the method of FIG. 7 further includes:
- receiving an input feature map IFM; and
- convolving the input feature map IFM with the defined filter F to provide an output feature map OFM.

The convolution may be performed with any suitable stride; i.e. it may be performed with a stride of one or two or more.

In more detail, when using the sub-filters of the present disclosure, and as illustrated in FIG. 7, the step of: convolving the input feature map IFM with the defined filter F, includes: convolving the input feature map IFM with each of the plurality of sub-filters $SF_{1...n}$ in their respective positions in the combination to provide a plurality of corresponding partial feature maps, and summing the partial feature maps to provide the output feature map OFM.

As part of the convolution, the input feature map IFM may be padded in order to provide an output feature map having the same dimensions as the input feature map. In other words it may have "same padding". Thus, the step of: convolving the input feature map IFM with the defined filter F, may include: padding the input feature map IFM such that the output feature map OFM has the same dimensions as the input feature map IFM.

Alternatively, the input feature map IFM may not include any padding; i.e. it may have "valid padding".

The above-described embodiments of methods may be provided on a non-transitory computer-readable storage medium comprising a set of computer-readable instructions stored thereon which, when executed by at least one processor, cause the at least one processor to perform the method.

The above-described embodiments of methods may also be implemented as a computer program product. The computer program product can be provided by dedicated hardware or hardware capable of running the software in association with appropriate software. When provided by a processor, these functions can be provided by a single dedicated processor, a single shared processor, or multiple individual processors that some of the processors can share. Moreover, the explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, embodiments can take the form of a computer program product accessible from a computer usable storage medium or a computer readable storage medium, the computer program product providing program code for use by or in connection with a computer or any instruction execution system. For the purposes of this description, a computer-usable storage medium or computer-readable storage medium can be any apparatus that can comprise, store, communicate, propagate, or transport a program for use by or in connection with an instruction execution system, apparatus, or device. The medium can be an electronic, magnetic, optical, electromagnetic, infrared, or semiconductor system or device or propagation medium. Examples of computer readable media include semiconductor or solid state memories, magnetic tape, removable computer disks, random access memory "RAM", read only memory "ROM", rigid magnetic disks, and optical disks. Current examples of optical disks include compact disk-read only memory "CD-ROM", optical disk-read/write "CD-R/W", Blu-Ray™, and DVD.

Figure 8:
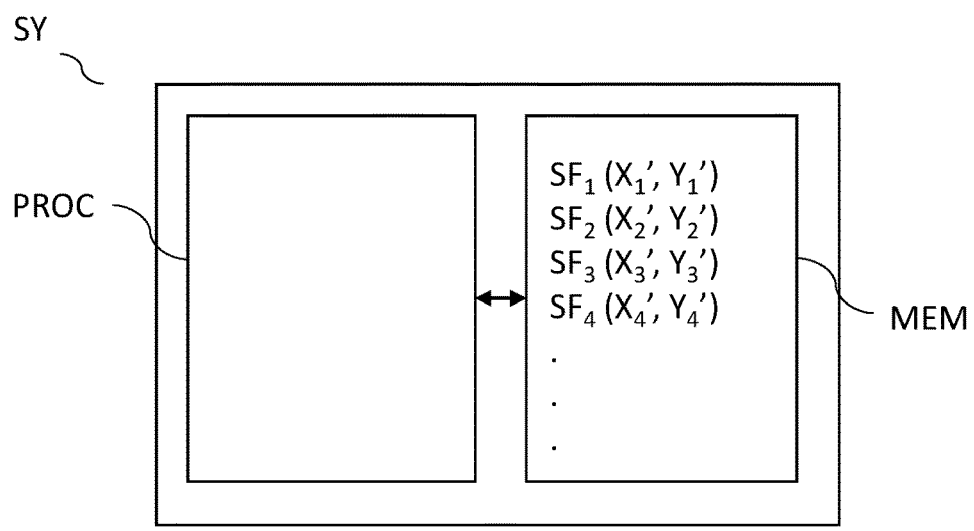
FIG. 8 illustrates a system SY that includes a processor PROC and a memory MEM.

In some embodiments a system is provided for execution of the method. Thereto, FIG. 8 illustrates a system SY that includes a processor PROC and a memory MEM. System SY includes at least one processor PROC; and at least one memory MEM. The memory includes instructions which when executed on the at least one processor; cause the processor to provide a filter F of a neural processing unit by:

receiving input corresponding to target dimensions $X_T$, $Y_T$ of the filter F;

receiving input corresponding to sub-filter dimensions $X_{1...n}'$, $Y_{1...n}'$ of each of a plurality of sub-filters $SF_{1...n}$ implementable in the neural processing unit;

defining the filter as a combination of the plurality of sub-filters $SF_{1...n}$, the combination having dimensions that equate to the target dimensions $X_T$, $Y_T$, and wherein the sub-filter dimensions $X_{1...n}'$, $Y_{1...n}'$ of at least two of the sub-filters in the combination are unequal.

The system may for instance be a processor, or a neural processing unit. The neural processing unit may correspond to elements of the neural processing unit illustrated in FIG. 2. In some embodiments the processor of the system may be further configured to:

receive an input feature map IFM; and use the defined filter F to generate an output feature map OFM from the input feature map IFM by convolving the input feature map IFM with the defined filter F.

The above embodiments are to be understood as illustrative examples of the present disclosure. Further embodiments are envisaged. For example, the embodiments described in relation to a method may also be implemented in the computer program product, in the computer readable storage medium, or in the system. It is therefore to be understood that a feature described in relation to any one embodiment may be used alone, or in combination with other features described, and may also be used in combination with one or more features of another of the embodiments, or a combination of other the embodiments. Furthermore, equivalents and modifications not described above may also be employed without departing from the scope of the disclosure, which is defined in the accompanying claims.

What is claimed is:

1. A computer-implemented method comprising:

receiving input corresponding to target dimensions ($X_T$, $Y_T$) of a filter (F) for a neural processing unit;

receiving input corresponding to sub-filter dimensions ($X_{1...n}'$, $Y_{1...n}'$) of each of a plurality of sub-filters ($SF_{1...n}$) implementable in the neural processing unit;

defining the filter (F) as a combination of the plurality of sub-filters ($SF_{1...n}$), the combination having dimensions that equate to the target dimensions ($X_T$, $Y_T$), and wherein the sub-filter dimensions ($X_{1...n}'$, $Y_{1...n}'$) of at least two of the sub-filters in the combination are unequal;

receiving an input feature map (IFM); and convolving the input feature map (IFM) with the defined filter (F) to provide an output feature map (OFM);

wherein convolving the input feature map (IFM) with the defined filter (F) comprises convolving the input feature map (IFM) with each of the plurality of sub-filters ($SF_{1...n}$) in their respective positions in the combination to provide a plurality of corresponding partial feature maps, and summing the partial feature maps to provide the output feature map (OFM);

wherein the sub-filter dimensions ($X_{1...n}'$, $Y_{1...n}'$) of each of the plurality of sub-filters ($SF_{1...n}$) include an X-dimension parameter ($X_{1...n}'$) representing a number of columns of the sub-filter, and a Y-dimension parameter ($Y_{1...n}'$) representing a number of rows of the sub-filter, and wherein a size of each sub-filter is defined by a product of the X-dimension parameter ($X_{1...n}'$) and the respective Y-dimension parameter ($Y_{1...n}'$), at least one of the X-dimension parameter ($X_{1...n}'$) and the Y-dimension parameter ($Y_{1...n}'$) of each sub-filter being smaller than the target dimensions ($X_T$, $Y_T$) of the filter (F);

wherein defining the filter as a combination of the plurality of sub-filters ($SF_{1...n}$), comprises successively including sub-filters ($SF_{1...n}$) in the combination until the target dimensions ($X_T$, $Y_T$) of the filter (F) are filled by the combination with no remaining space, each included sub-filter having the largest possible sub-filter size that fits into the remaining space.

2. The computer-implemented method according to claim 1, wherein defining the filter as a combination of the plurality of sub-filters ($SF_{1...n}$), comprises successively including sub-filters ($SF_{1...n}$) in the combination until the target dimensions ($X_T$, $Y_T$) of the filter (F) are filled by the combination with no remaining space, each included sub-filter having the largest possible sub-filter size that fits into the remaining space, and wherein if a plurality of sub-filters having the same sub-filter size fit into the remaining space, including from said plurality having the same sub-filter size the sub-filter having the lowest value of $\sqrt{(X_{1...n}')^2+(Y_{1...n}')^2}$.

3. The computer-implemented method according to claim 1, wherein successively including sub-filters ($SF_{1...n}$) in the combination until the target dimensions ($X_T$, $Y_T$) of the filter (F) are filled by the combination with no remaining space; comprises filling the target dimensions ($X_T$, $Y_T$) of the filter in row-major order by, for each of a plurality groups of rows of the filter (F):

selecting an initial sub-filter ($SFo_1$) for the group of rows, the initial sub-filter ($SFo_1$) having the largest possible sub-filter size that fits into the remaining space;

defining a group of rows within the sub-filter dimensions as a group of rows having the same Y-dimension parameter ($Y_{1...n}'$) as the initial sub-filter ($SFo_1$);

successively including sub-filters ($SF_{1...n}$) to fill the group of rows until there is no remaining space in the group of rows, each included sub-filter having the largest possible sub-filter size that fits into the remaining space in the group of rows.

4. The computer-implemented method according to claim 1, wherein successively including sub-filters ($SF_{1...n}$) in the combination until the target dimensions ($X_T$, $Y_T$) of the filter (F) are filled by the combination with no remaining space; comprises filling the target dimensions ($X_T$, $Y_T$) of the filter in column-major order by, for each of a plurality groups of columns of the filter (F):

selecting an initial sub-filter ($SFo_1$) for the group of columns, the initial sub-filter ($SFo_1$) having the largest possible sub-filter size that fits into the remaining space;

defining a group of columns within the sub-filter dimensions as a group of columns having the same X-dimension parameter ($X_{1...n}'$) as the initial sub-filter ($SFo_1$);

successively including sub-filters ($SF_{1...n}$) to fill the group of columns until there is no remaining space in the group of columns, each included sub-filter having the largest possible sub-filter size that fits into the remaining space in the group of columns.

5. The computer-implemented method according to claim 1, wherein the target dimensions ($X_T$, $Y_T$) include a target X-dimension parameter ($X_T$) representing a number of columns of the filter (F) and a target Y-dimension parameter ($Y_T$) representing a number of rows of the filter (F); and wherein the combination includes at least one sub-filter ($SF_{1...n}$) having:

the largest X-dimension parameter ($X_{1...n}'$), or the largest Y-dimension parameter ($Y_{1...n}'$), or the largest size, the size being defined by a product of the X-dimension parameter ($X_{1...n}'$) and the Y-dimension parameter ($Y_{1...n}'$);

that fits within the target dimensions ($X_T$, $Y_T$) of the filter (F).

6. The computer-implemented method according to claim 1, wherein the target dimensions (X, Y) include a target X-dimension parameter ($X_T$) and a target Y-dimension parameter ($Y_T$); and wherein the sub-filter dimensions ($X_{1...n}'$, $Y_{1...n}'$) of each of the plurality of sub-filters ($SF_{1...n}$) implementable in the neural processing unit include a corresponding X-dimension parameter ($X_{1...n}'$) representing a number of columns of the sub-filter and a corresponding Y-dimension parameter ($Y_{1...n}'$) representing a number of rows of the sub-filter; and wherein:

the target X-dimension parameter ($X_T$) equals or exceeds a maximal implementable X-dimension parameter ($X'_{max}$) that is the maximum of said X-dimension parameters ($X_{1...n}'$) implementable in the neural processing unit;

the target Y-dimension parameter ($Y_T$) equals or exceeds a maximal implementable Y-dimension parameter ($Y'_{max}$) that is the maximum of said Y-dimension parameters ($Y_{1...n}'$) implementable in the neural processing unit.

7. The computer-implemented method according to claim 1, wherein the combination of the plurality of sub-filters ($SF_{1...n}$) that equate to the target dimensions ($X_T$, $Y_T$) of the filter (F) corresponds to the minimum number of sub-filters that can equate to the target dimensions ($X_T$, $Y_T$) of the filter (F).

8. The computer-implemented method according to claim 1, wherein the filter (F) comprises a dilated filter; and wherein the target dimensions ($X_T$, $Y_T$) provided by the combination of the plurality of sub-filters ($SF_{1...n}$) correspond to the dimensions of the dilated filter.

9. The computer-implemented method according to claim 1 wherein the filter (F) is a filter of a neural network layer (CL).

10. A non-transitory computer-readable storage medium comprising a set of computer-readable instructions stored thereon which, when executed by at least one processor, cause the at least one processor to perform the method according to claim 1.

11. A system (SY) comprising:

at least one processor (PROC);

at least one memory (MEM); and a neural processing unit;

wherein the at least one memory comprises instructions which when executed on the at least one processor; cause the at least one processor to provide a filter (F) to the neural processing unit by:

receiving input corresponding to target dimensions ($X_T$, $Y_T$) of the filter (F);

receiving input corresponding to sub-filter dimensions ($X_{1...n}'$, $Y_{1...n}'$) of each of a plurality of sub-filters ($SF_{1...n}$) implementable in the neural processing unit; and defining the filter as a combination of the plurality of sub-filters ($SF_{1...n}$), the combination having dimensions that equate to the target dimensions ($X_T$, $Y_T$), and wherein the sub-filter dimensions ($X_{1...n}'$, $Y_{1...n}'$) of at least two of the sub-filters in the combination are unequal;

wherein the sub-filter dimensions ($X_{1...n}'$, $Y_{1...n}'$) of each of the plurality of sub-filters ($SF_{1...n}$) include an X-dimension parameter ($X_{1...n}'$) representing a number of columns of the sub-filter, and a Y-dimension parameter ($Y_{1...n}'$) representing a number of rows of the sub-filter, and wherein a size of each sub-filter is defined by a product of the X-dimension parameter ($X_{1...n}'$) and the respective Y-dimension parameter ($Y_{1...n}'$), at least one of the X-dimension parameter ($X_{1...n}'$) and the Y-dimension parameter ($Y_{1...n}'$) of each sub-filter being smaller than the target dimensions ($X_T$, $Y_T$) of the filter (F);

wherein defining the filter as a combination of the plurality of sub-filters ($SF_{1...n}$), comprises successively including sub-filters ($SF_{1...n}$) in the combination until the target dimensions ($X_T$, $Y_T$) of the filter (F) are filled by the combination with no remaining space, each included sub-filter having the largest possible sub-filter size that fits into the remaining space;

wherein the at least one memory comprises instructions which when executed on the neural processing unit cause the neural processing unit to provide an output feature map (OFM) by:

receiving an input feature map (IFM); and convolving the input feature map (IFM) with the defined filter (F) to provide the output feature map (OFM); and wherein convolving the input feature map (IFM) with the defined filter (F) comprises convolving the input feature map (IFM) with each of the plurality of sub-filters ($SF_{1...n}$) in their respective positions in the combination to provide a plurality of corresponding partial feature maps, and summing the partial feature maps to provide the output feature map (OFM).

12. A neural processing unit comprising at least one processor configured to:

receive a filter (F);

receive an input feature map (IFM); and convolve the input feature map (IFM) with the filter (F) to provide an output feature map (OFM);

wherein the filter (F) is defined as a combination of a plurality of sub-filters ($SF_{1...n}$), the combination having dimensions that equate to target dimensions ($X_T$, $Y_T$) of the filter (F), and wherein sub-filter dimensions ($X_{1...n}'$, $Y_{1...n}'$) of at least two of the sub-filters in the combination are unequal;

wherein sub-filter dimensions ($X_{1...n}'$, $Y_{1...n}'$) of each of the plurality of sub-filters ($SF_{1...n}$) are implementable in the neural processing unit and include an X-dimension parameter ($X_{1...n}'$) representing a number of columns of the sub-filter, and a Y-dimension parameter ($Y_{1...n}'$) representing a number of rows of the sub-filter, and wherein a size of each sub-filter is defined by a product of the X-dimension parameter ($X_{1...n}'$) and the respective Y-dimension parameter ($Y_{1...n}'$), at least one of the X-dimension parameter ($X_{1...n}'$) and the Y-dimension parameter ($Y_{1...n}'$) of each sub-filter being smaller than the target dimensions ($X_T, Y_T$) of the filter (F);

wherein defining the filter as a combination of the plurality of sub-filters ($SF_{1...n}$), comprises successively including sub-filters ($SF_{1...n}$) in the combination until the target dimensions ($X_T, Y_T$) of the filter (F) are filled by the combination with no remaining space, each included sub-filter having the largest possible sub-filter size that fits into the remaining space; and wherein convolving, by the neural processing unit, the input feature map (IFM) with the filter (F) comprises convolving the input feature map (IFM) with each of the plurality of sub-filters ($SF_{1...n}$) in their respective positions in the combination to provide a plurality of corresponding partial feature maps, and summing the partial feature maps to provide the output feature map (OFM).

* * * * *